Feb. 6, 1951 D. J. BARCHOK ET AL 2,540,087

METHOD AND MEANS FOR IDENTIFYING AIRCRAFT

Filed July 29, 1943 13 Sheets-Sheet 1

INVENTORS.
DONALD J. BARCHOK
& IRVING STOKES.
BY William D. Hall.
Attorney

INVENTORS.
DONALD J. BARCHOK
& IRVING STOKES.
BY William D. Hall
Attorney

Feb. 6, 1951 D. J. BARCHOK ET AL 2,540,087

METHOD AND MEANS FOR IDENTIFYING AIRCRAFT

Filed July 29, 1943 13 Sheets-Sheet 3

INVENTORS.
DONALD J. BARCHOK
& IRVING STOKES.
BY William D. Hall
Attorney

METHOD AND MEANS FOR IDENTIFYING AIRCRAFT

Filed July 29, 1943 13 Sheets-Sheet 4

INVENTORS.
DONALD J. BARCHOK
& IRVING STOKES.
BY William D. Hall.
Attorney

Feb. 6, 1951 D. J. BARCHOK ET AL 2,540,087

METHOD AND MEANS FOR IDENTIFYING AIRCRAFT

Filed July 29, 1943 13 Sheets-Sheet 5

INVENTORS.
DONALD J. BARCHOK
& IRVING STOKES.
BY William D. Hall.
Attorney

Feb. 6, 1951 D. J. BARCHOK ET AL 2,540,087

METHOD AND MEANS FOR IDENTIFYING AIRCRAFT

Filed July 29, 1943 13 Sheets-Sheet 6

INVENTORS.
DONALD J. BARCHOK
& IRVING STOKES.
BY William D. Hall.
Attorney

METHOD AND MEANS FOR IDENTIFYING AIRCRAFT

INVENTORS.
DONALD J. BARCHOK
& IRVING STOKES.
BY William D. Hall
Attorney

INVENTORS.
DONALD J. BARCHOK
& IRVING STOKES.
BY William D. Hall.
Attorney

INVENTORS.
DONALD J. BARCHOK
& IRVING STOKES.
BY William D. Hall.
Attorney.

Feb. 6, 1951 D. J. BARCHOK ET AL 2,540,087

METHOD AND MEANS FOR IDENTIFYING AIRCRAFT

Filed July 29, 1943 13 Sheets-Sheet 10

INVENTORS.
DONALD J. BARCHOK
& IRVING STOKES.

BY William D. Hall
Attorney

Feb. 6, 1951 D. J. BARCHOK ET AL 2,540,087

METHOD AND MEANS FOR IDENTIFYING AIRCRAFT

Filed July 29, 1943 13 Sheets-Sheet 11

INVENTORS.
DONALD J. BARCHOK
& IRVING STOKES.

BY William D. Hall.
Attorney.

Feb. 6, 1951 D. J. BARCHOK ET AL 2,540,087

METHOD AND MEANS FOR IDENTIFYING AIRCRAFT

Filed July 29, 1943 13 Sheets-Sheet 12

INVENTORS.
DONALD J. BARCHOK
& IRVING STOKES.

BY William D Hall
Attorney

INVENTORS.
DONALD J. BARCHOK
& IRVING STOKES.
BY William D. Hall.
Attorney.

Patented Feb. 6, 1951

2,540,087

UNITED STATES PATENT OFFICE 2,540,087

METHOD AND MEANS FOR IDENTIFYING AIRCRAFT

Donald J. Barchok, Belmar, and Irving Stokes, Neptune, N. J.

Application July 29, 1943, Serial No. 496,652

(Granted under the act of March 3, 1883, as amended April 30, 1928; 370 O. G. 757)

11 Claims. (Cl. 343—6)

The invention described herein may be manufactured and used by or for the Government for governmental purposes, without the payment to us of any royalty thereon.

Our present invention relates to a method and means for interrogating aircraft from the ground whereby distinction may be made between those which are friendly and those which are hostile, and while not limited thereto, it is admirably adapted for use in cooperation with a pulse-echo system for aircraft detection.

In one form of such a system, pulses of high frequency energy are projected into space at an audio frequency rate and are made to scan through 360° of azimuth. Should the energy so projected encounter an object in space such as an aircraft, a portion thereof is reflected and the reflection or echo is received back at the detecting station. A portion of both the original transmission and the echo are applied to an indicating device such as an oscilloscope provided with a horizontal sweep, the original transmission appearing, in the form of a vertical deflection, at the commencement of the sweep and the reflected energy or echo appearing, also in the form of a vertical deflection, somewhere along the oscilloscope base line, depending upon the distance between the detecting station and the object causing the echo. There is generated in synchronism with the pulse transmission, and superimposed upon the oscilloscope sweep, a negative-going marker notch the phase of which may be varied with respect to the pulse transmission so that the notch can be moved along the oscilloscope base line. The device for shifting the phase of the marker notch voltage is calibrated in terms of distance, so that when the notch is moved along the oscilloscope base line into alignment with any selected echo appearing on such base line, the operator is immediately informed of the range of the object causing that particular echo.

In addition, the reflected echoes are applied to another oscilloscope, of the PPI (plan position indicator) type, i. e., one provided with a radial sweep synchronized with the pulse transmission of the system, said radial sweep being rotatable about its point of origin in synchronism with the azimuthal scanning motion of the system. By means of this oscilloscope the bearing in azimuth of each echo-causing object is indicated by the angular orientation of the radial sweep, while the range of said object is indicated by the position of the echo-indicating signal along said radial sweep.

Heretofore, interrogation equipment has been designed for cooperation with pulse-echo systems for object detection having general characteristics similar to the one just described, but the connection therebetween has necessitated alterations in the detecting equipment which often caused the introduction of inaccuracies in various portions of the detecting system, particularly in the range-determining portion thereof. In addition, the interrogation equipment heretofore employed has been of limited use because of its inability to determine the identity of particular preselected echo-causing objects.

It is therefore an object of the present invention to provide an accurate and fool-proof interrogation system for use in cooperation with an object detection system whereby the possibility of error in identifying detected aircraft is practically eliminated.

It is a further object of the present invention to provide an interrogation system for use in cooperation with an object detection system without requiring such alterations as might cause any unfavorable interaction between the two systems.

It is still another object of the present invention to provide an interrogation system whereby a particular or selected craft of a plurality of craft detected by the detecting system may be challenged to establish the identity thereof.

These and other objects and advantages, which will become obvious to those skilled in the art as the detailed description progresses, are attained in the present invention in the following manner: A portion of the pulse-generating voltage of the detection system is utilized to synchronize the keying of a transmitter in the interrogation system whereby there is periodically radiated into space, in directional alignment with the pulse transmission of the detecting system and in a preselected azimuthal plane, a challenging signal. The challenging signal triggers a transponder, which is an airborne transmitter carried by friendly aircraft, and the latter automatically transmits a recognition signal upon being so triggered. Since such automatically-triggered transmitters are well known in the art and do not constitute per se any part of our invention, no further description thereof need be given.

The antenna of the interrogation equipment is so designed as to have a dual response pattern and by means of a pattern or lobe-switching mechanism associated with the antenna which, per se, is no part of the present invention and therefore not shown, the recognition signal receiver responds to signals alternately from the two patterns of the antenna. When the plane of the antenna is normal to a line between the ground station and the aircraft being interrogated, the amplitude of the signals from each antenna pattern will be equal and application of these signals to an oscilloscope, the sweep of which is synchronized with the above referred to notch-generating voltage of the detection system range oscilloscope, results in a picture consisting of two adjacent vertical deflections of the oscilloscope base line of equal height. Such a picture corresponds to an "on target" condition and indicates that the challenged aircraft is friendly. Should the recognition signal oscilloscope of the interrogation system fail to indicate the presence of an object at a time when the range oscilloscope of the detecting system displays a reflected echo within the notch in the base line thereof, those on the ground are immediately informed that the craft upon which the equipment is trained is hostile. Or, should the recognition signal oscilloscope show a picture wherein one of the vertical deflections is of greater magnitude than the other, those on the ground are immediately informed that there is a friendly craft in the vicinity but it is not in the azimuthal plane to which the antennae are normal and the craft that is in the "on-target" position is hostile.

In the following specification we describe and in the annexed drawings show a specific embodiment of the present invention, but it is to be clearly understood that said embodiment is merely illustrative and is not intended to limit the true spirit and scope of the invention, as set forth in the appended claims.

In said drawings.

Figure 6:
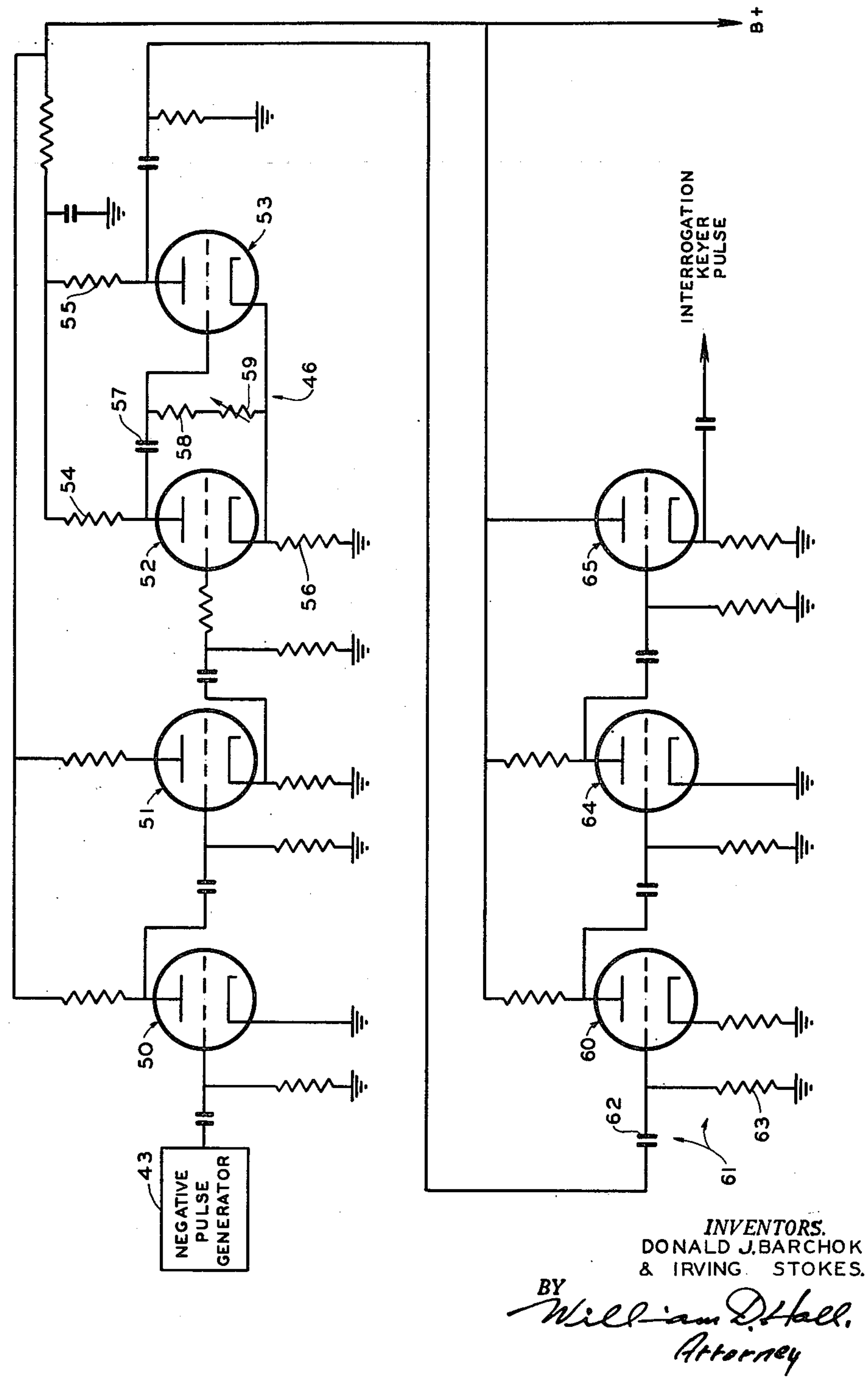
Figure 6 is a schematic diagram of a keyer-pulse-generating circuit.
Figure 7:
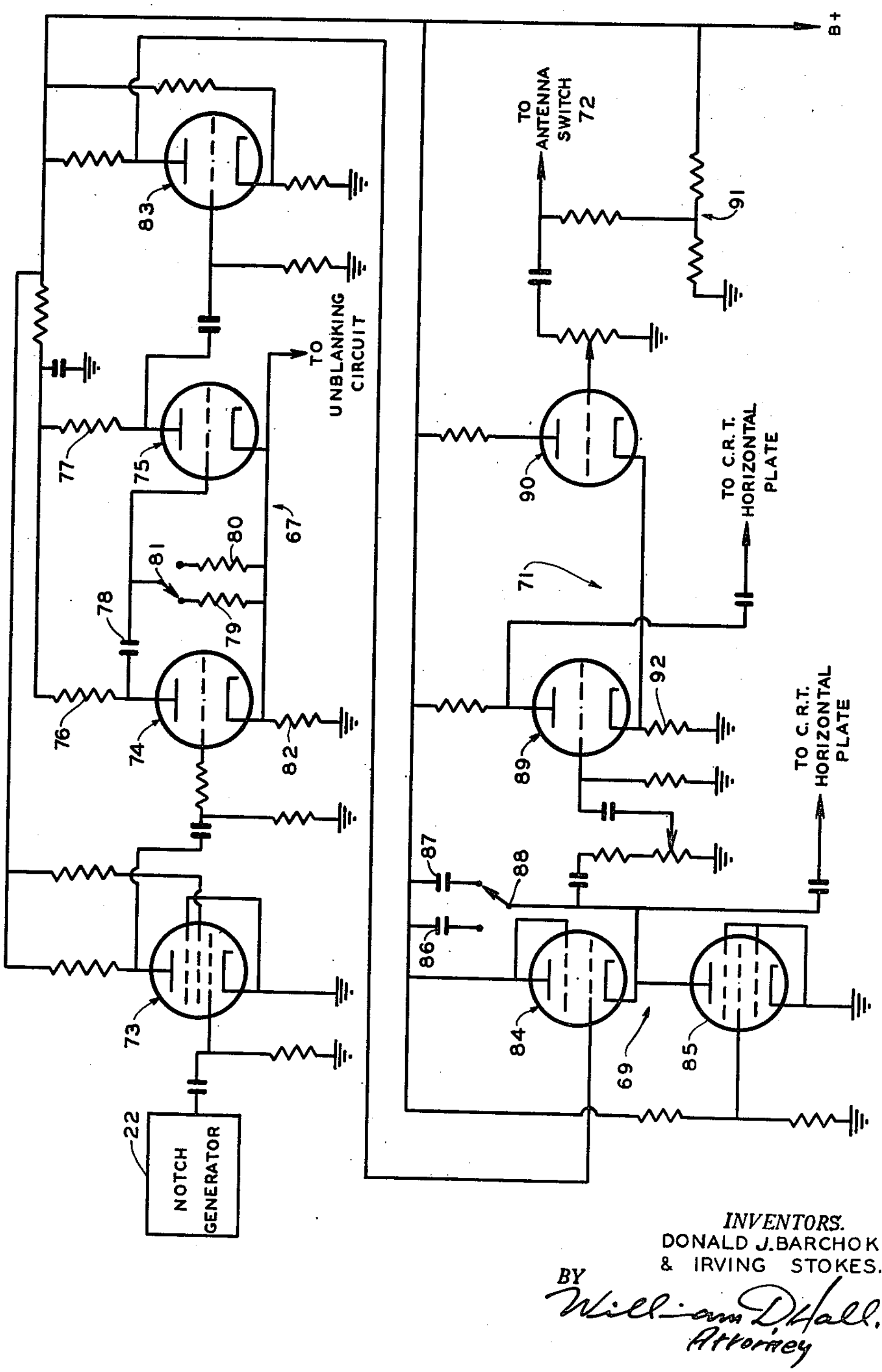
Figure 7 is a schematic diagram of an oscilloscope sweep-generating circuit.
Figure 8:
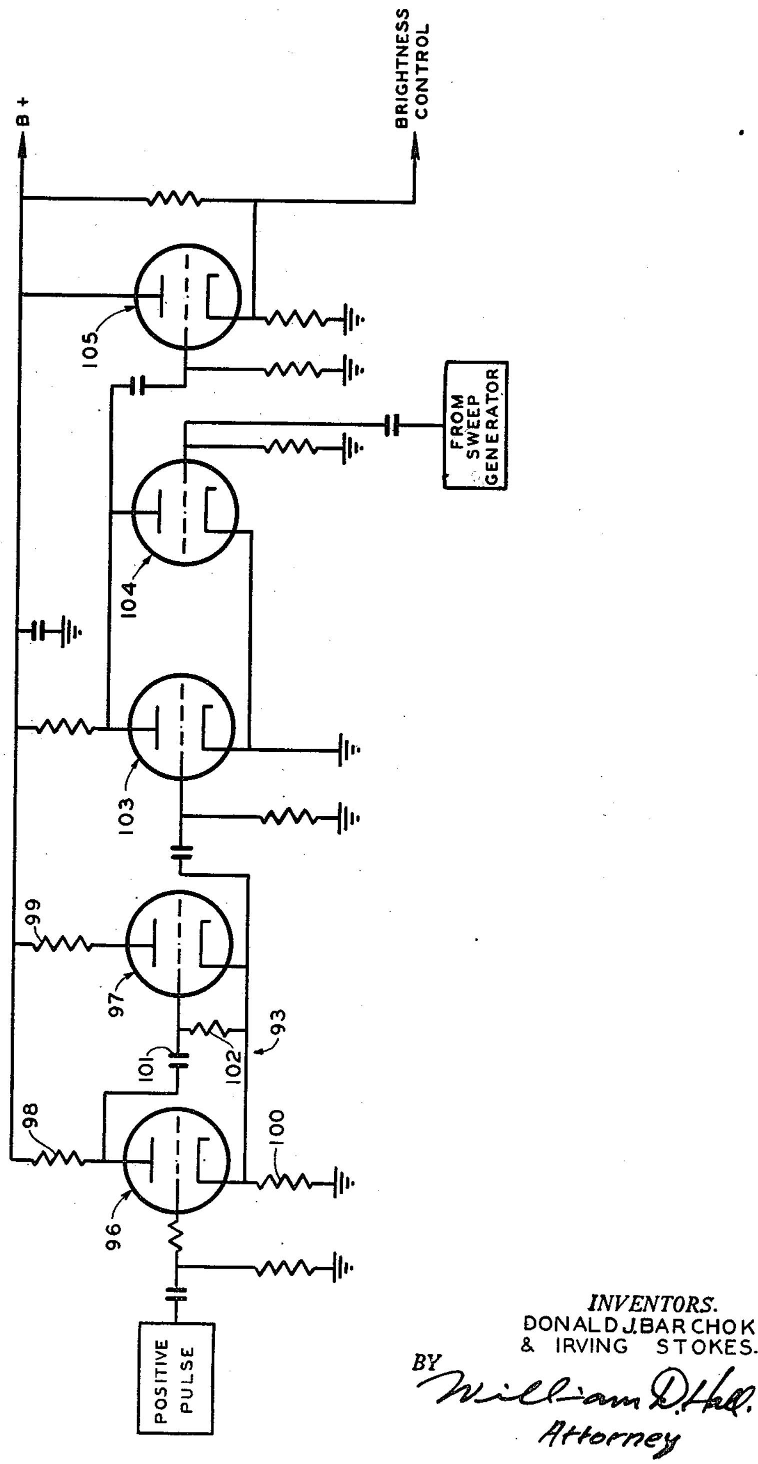
Figure 8 is a schematic diagram of an oscilloscope unblanking-voltage-generating circuit.
Figure 10:
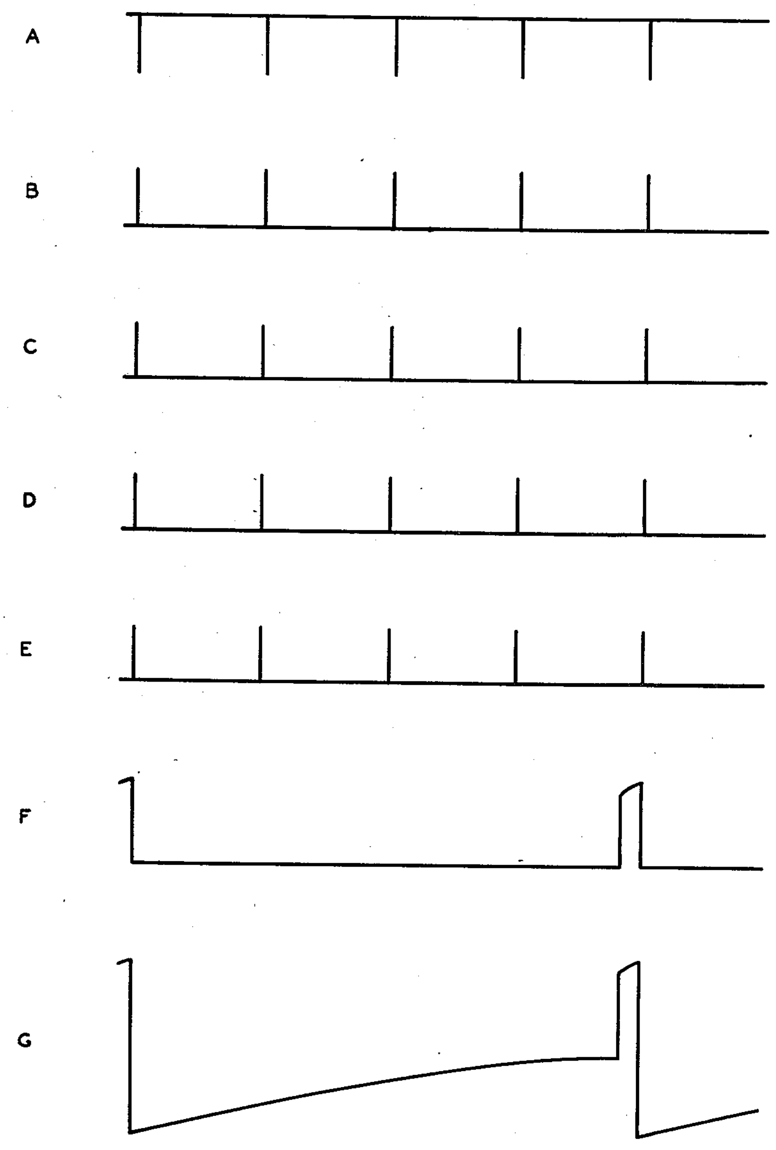
Figure 10:
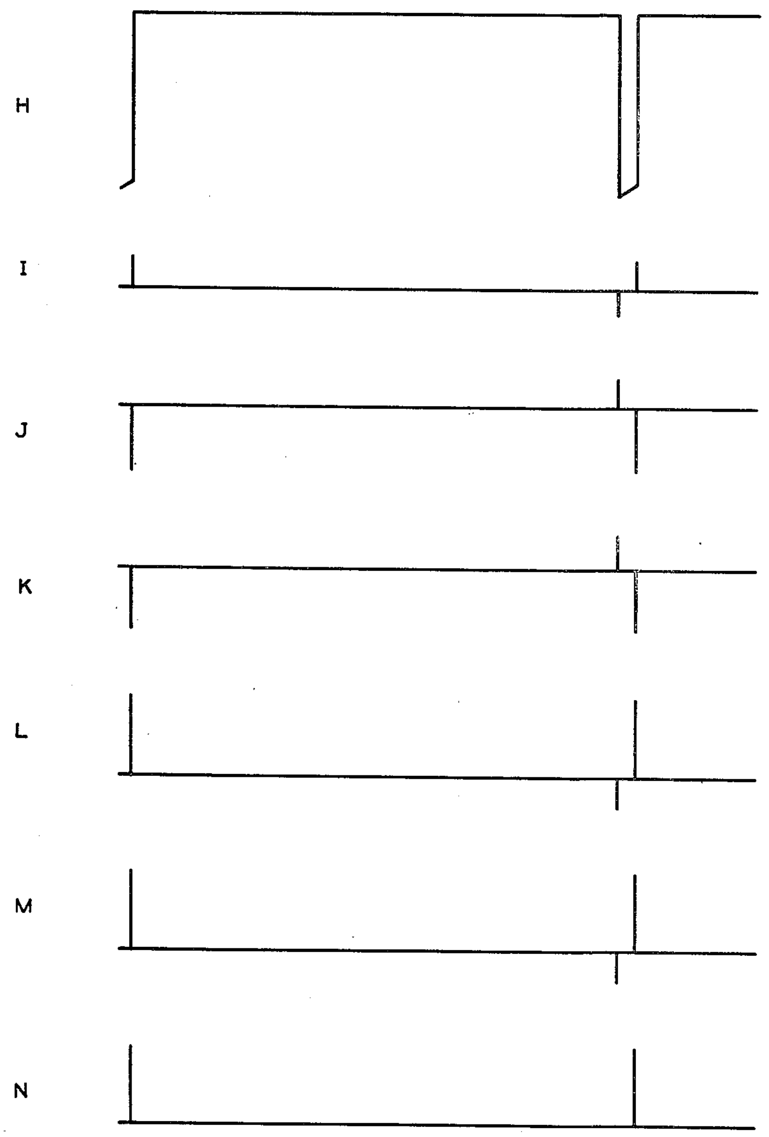
Figure 11:
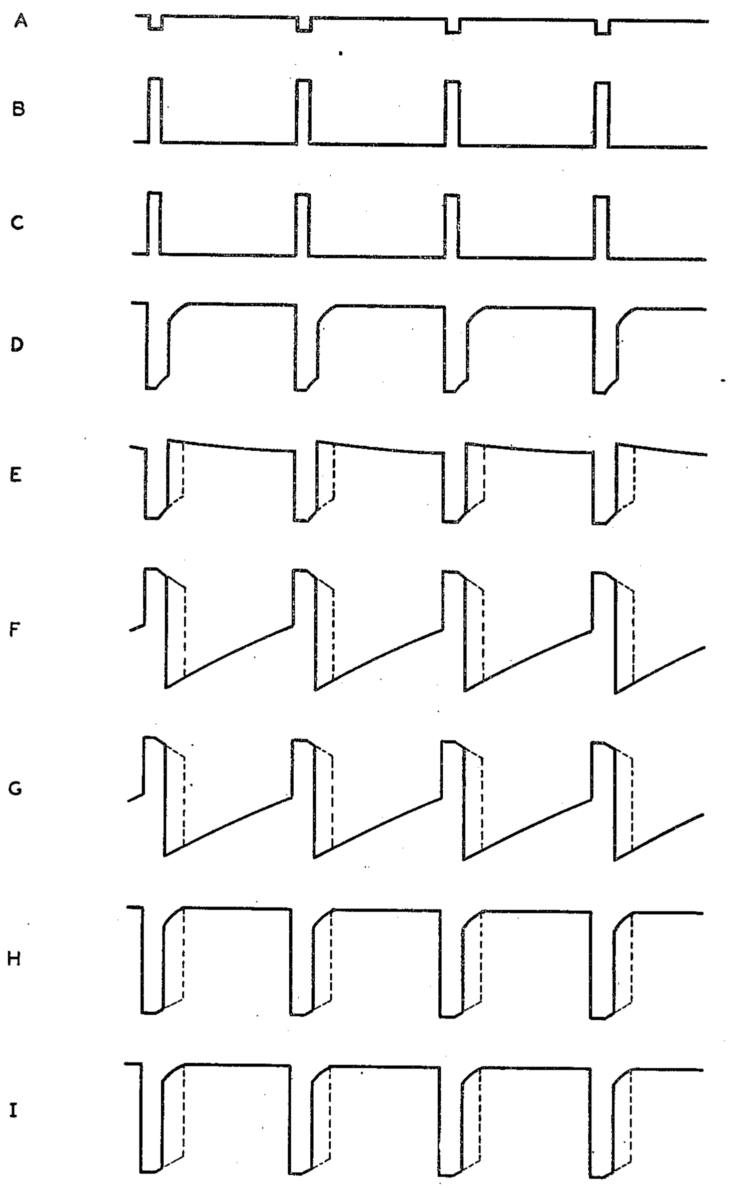
Figure 11:
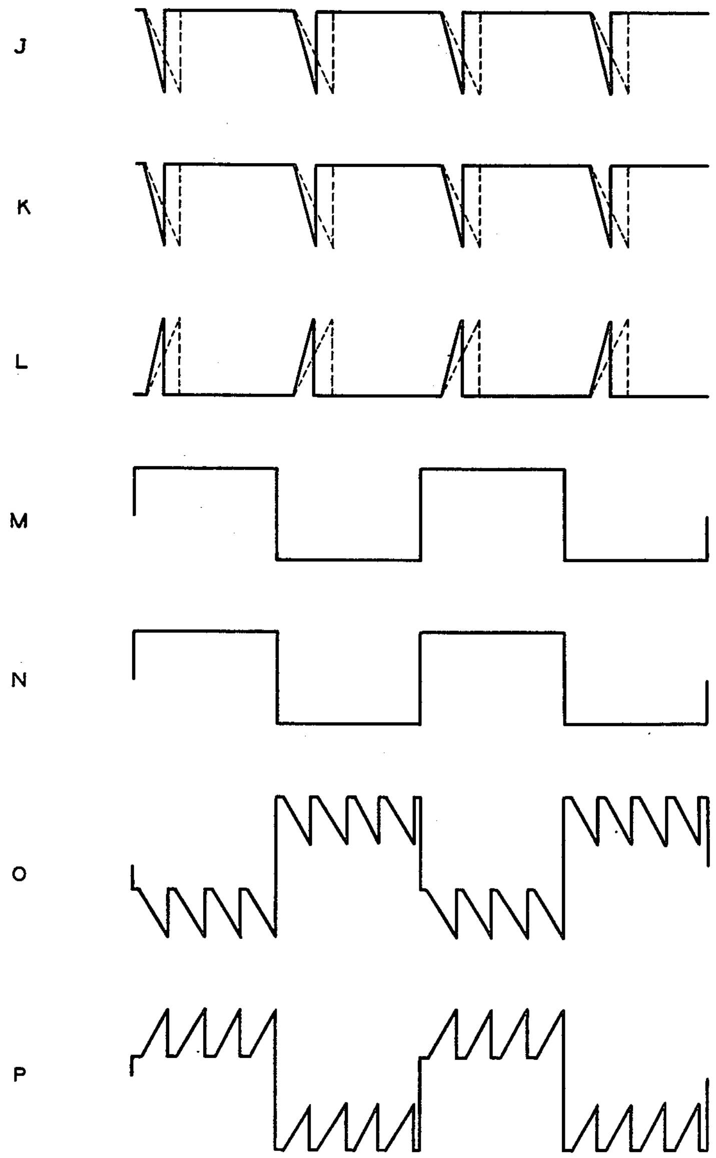
Figure 12:
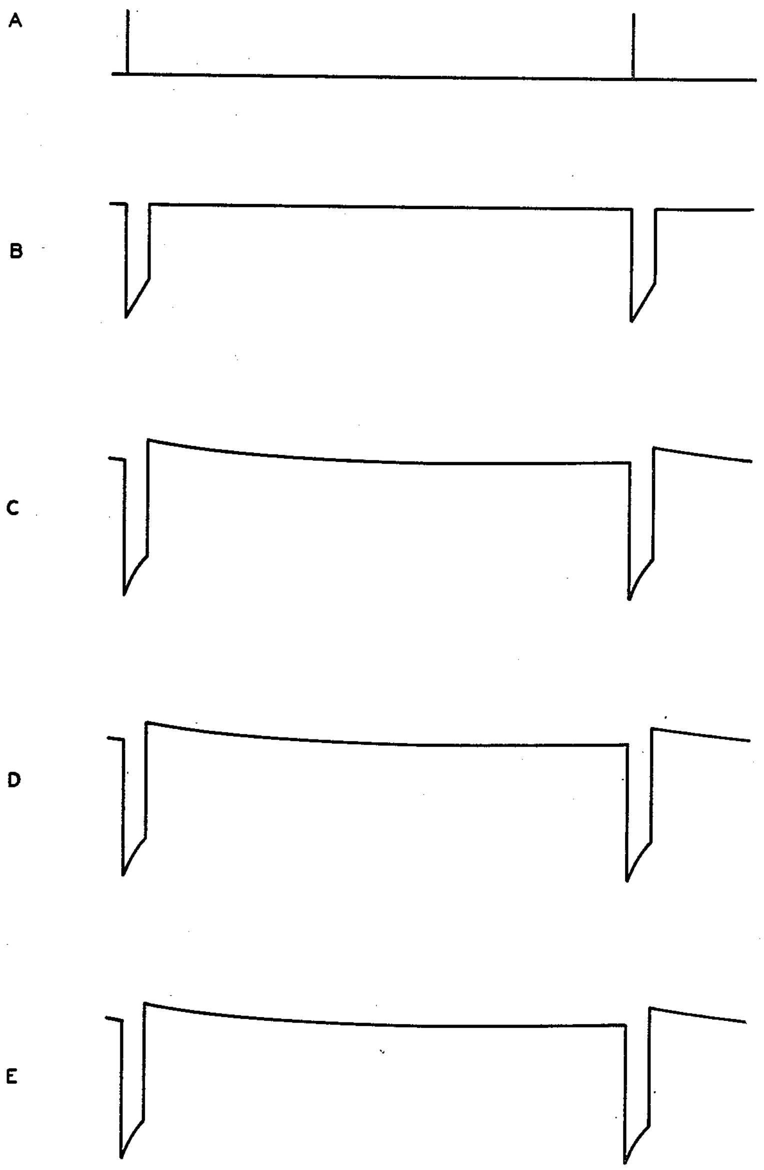
Figure 12:
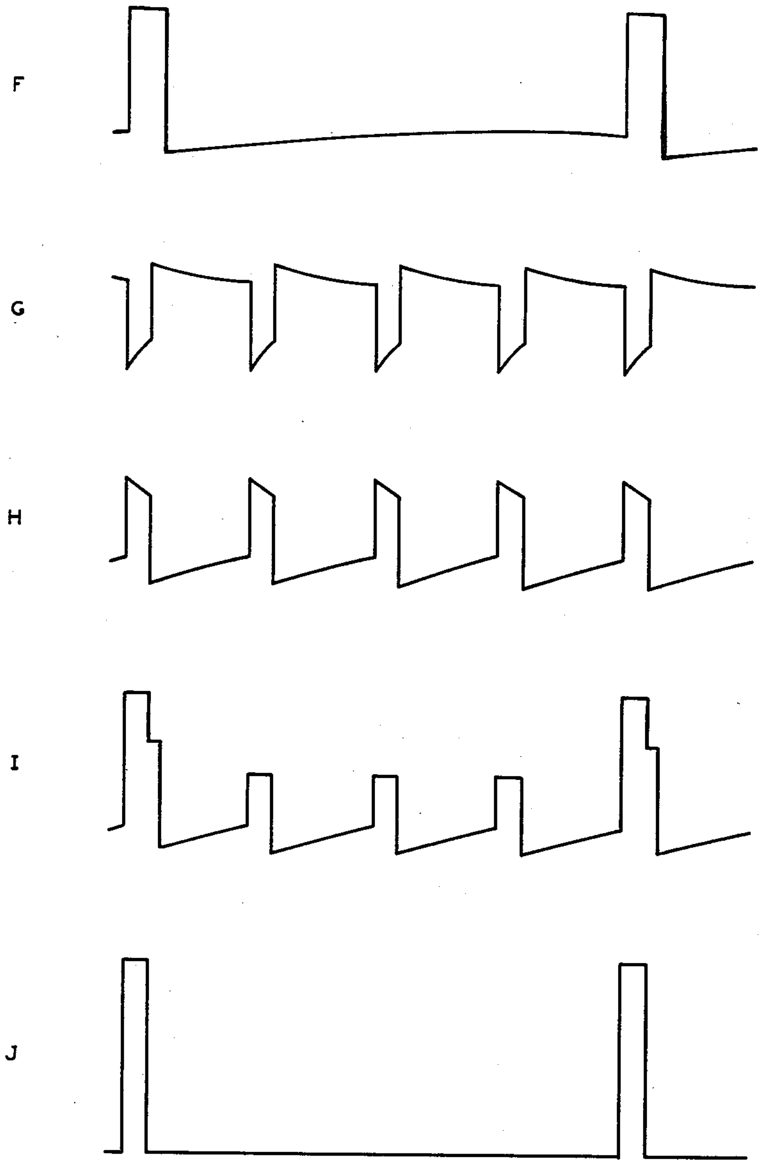

Figures 10–A to 10–N inclusive show the various wave shapes associated with the keyer-pulse-generating circuit of Figure 6;

Figures 11–A to 11–P inclusive show the various wave shapes associated with the oscilloscope sweep circuit of Figure 7; and Figures 12–A to 12–J inclusive show the various wave shapes associated with the unblanking-voltage-generator of Figure 8.

Figure 1:
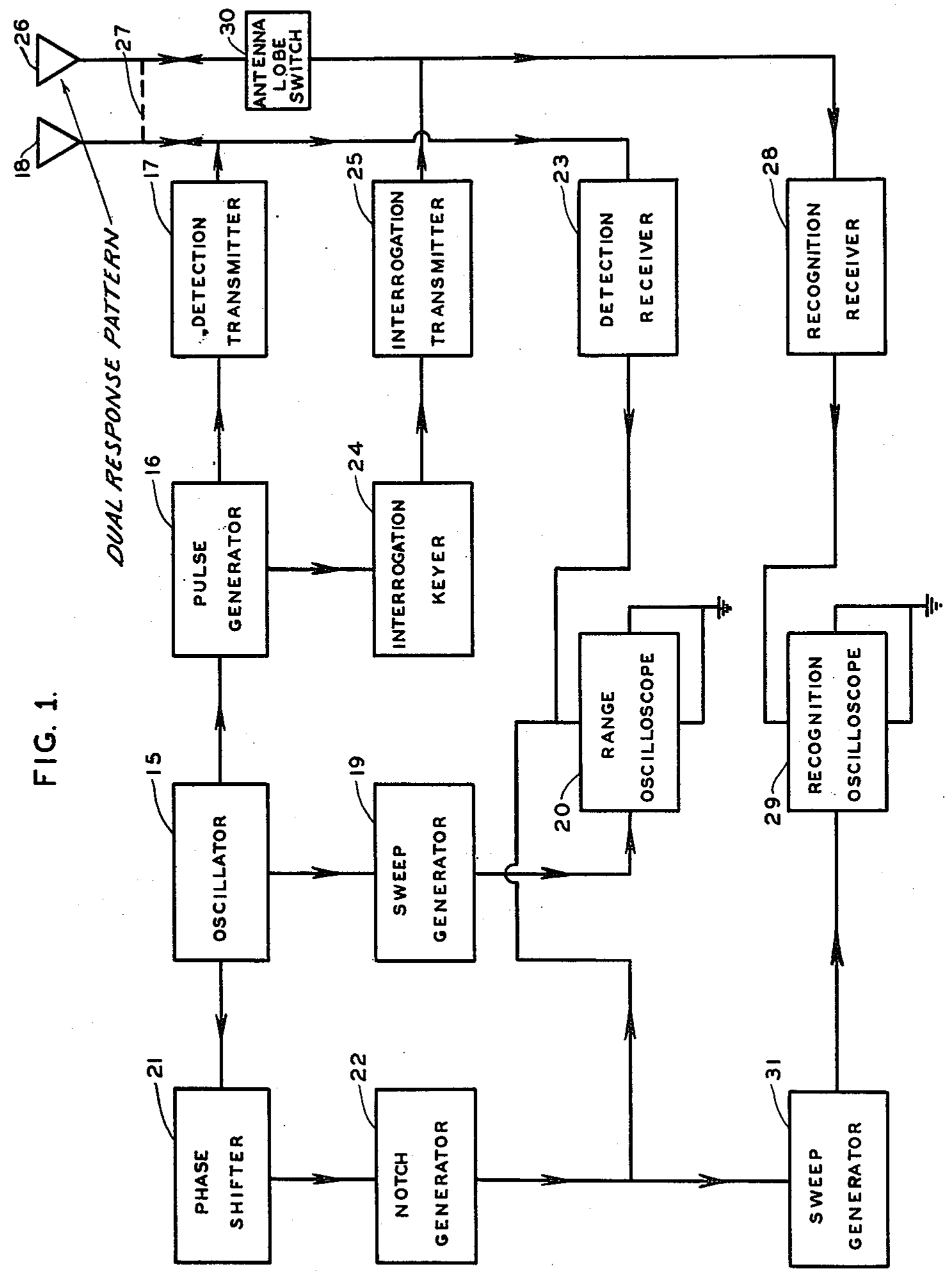
Figure 1 is a block diagram of a combined object detection and interrogation system assembled in accordance with the principles of the present invention.

We now refer more in detail to the aforesaid illustrative embodiment of the present invention, with particular reference to Figure 1 of the drawings showing the manner in which an object detection system and an interrogation system may be combined. While a specific form of detection system will be described in this specification it is to be understood that the interrogation system of the present invention is not limited to use therewith. Any other appropriate detecting system will serve as well.

In said Figure 1, we show an audio frequency oscillator 15 having a sine wave output. A portion of this output is fed to a pulse generator 16 to distort the same into short, sharp pulses, each of a few microseconds duration. These pulses are employed to key a transmitter 17 including a high frequency generator which is normally biased to cutoff but which is adapted, upon the application of the keying pulses, to periodically deliver high frequency oscillations to an appropriate antenna array 18. The latter preferably has highly directional characteristics and is preferably adapted to be rotated through 360° of azimuth, means being provided for stopping the rotation thereof so that the pulse transmission can be directed in a selected azimuthal plane.

Another portion of the output of the audio frequency oscillator 15 is fed to a sweep generator 19 where it is distorted into a saw-tooth wave for application to the horizontal deflecting plates of an oscilloscope 20, by means of which the range of a particular object detected by the system may be determined and the relative ranges of a plurality of objects may be observed.

As is well known, the distance separating an object in space such as an aircraft and a detecting station may be determined by measuring the time interval between the transmission of a pulse of high frequency energy and the reception back at the detecting station of a portion of the original transmission reflected by said object, one-half of the product of the time delay and $3\times10^8$, the velocity of propagation of radio waves in meters, giving the distance. In order to measure the time delay between the original transmission and the reception of a reflection or echo thereof, a third portion of the output of the audio frequency oscillator 15 is fed through a suitable phase shifter 21 to a negative-going notch generator 22. The output of the notch generator is applied to the vertical deflecting plates of the oscilloscope 20 and the saw-tooth wave of the sweep generator 19 is applied to the horizontal deflecting plates of the oscilloscope 20; and by shifting the phase of the notch-generating voltage, the notch may be moved along the base line of the oscilloscope. The distance separating the commencement of the sweep and the instantaneous position of the notch constitutes a measure of time and therefore of distance. Thus, by aligning the original transmission of the detection system with the commencement of the sweep of the oscilloscope 20 and moving the notch so as to center any selected echo therein, the magnitude of the phase shift necessary to so center the echo becomes a measure of the range of the object causing the particular echo, and the phase shifter may therefore be directly calibrated in terms of distance.

While we have described a keying pulse generator consisting of a sine wave generator and means to distort the sine wave into sharp pulses, it is to be understood that the pulses may be generated by using a spark gap keyer. In this event, a portion of the pulses so generated may be used to produce a sine wave voltage which can then be used to generate the range-determining notch.

The echoes from reflecting objects are preferably picked up by the same antenna as is used for the original transmission and are fed to a receiver 23 the output of which is applied to the vertical deflecting plates of the oscilloscope 20.

As already indicated, these echoes are also applied to the intensity grid of a PPI oscilloscope in order to obtain the location in azimuth of each object detected. This oscilloscope, not entering into the present invention except to inform the operator of the azimuthal bearing of any particular echo-causing object and therefore determining when the scanning operation is to be stopped, has not been shown in the drawings.

The description thus far has been limited to the object detection system and one form of the interrogation systems of the present invention and the manner of combining the same with said detection system is as follows:

A portion of the output of the pulse generator 16 of the detecting system is transformed into a series of negative pulses which are employed for generating the interrogation keyer pulses. In the interrogation keyer circuit 24 the pulse rate is reduced to avoid jamming the airborne transponder should several installations simultaneously challenge the same friendly aircraft. The keyer pulses thus generated are fed to an interrogation transmitter 25 consisting of a high frequency generator adapted to be inoperative except for the duration of the pulses fed thereto by the keyer. The carrier frequency of the interrogation transmitter is preferably different than that of the detection transmitter to eliminate interference. The output of the transmitter is applied to an appropriate antenna array 26 which is preferably mechanically coupled, as indicated at 27, with the detection system antenna array 18 so as to be rotatable in alignment with said detection system antenna array. However, the interrogation transmitter is put "on the air" only after a particular echo-causing object has been selected for challenge, the scanning of the detection system has been brought to a halt, and the radiations of both systems are directed in the azimuthal direction of the object so selected.

The interrogation system antenna array 26 is also connected to a receiver 28 tuned to the transmitter frequency of the airborne unit, and the output of this receiver is applied to the vertical deflecting plates of a recognition signal oscilloscope 29.

The antenna array 26 is preferably highly directional and is designed to have a dual response pattern, having associated therewith a lobe-switching mechanism 30 whereby the magnitude of the signals picked up thereby and fed to the recognition receiver 28 alternately depend upon the response pattern in operation and the angle formed by the azimuthal plane of the aircraft whose transmitter has been triggered and the planes of maximum response of each of the antenna patterns.

In order to display upon the recognition oscilloscope 29 recognition signals from a particular object, or a negative response therefrom, we provide said oscilloscope with a sweep, applied to the horizontal deflecting plates thereof and generated, by the circuit 31, in synchronism with the negative-going notch utilized in the detection system for determining the range of an object causing a selected echo.

By this arrangement, when the phase of the notch-generating voltage is adjusted so that the notch in the base line of the oscilloscope 20 is aligned with a particular echo, a friendly response can be displayed only from the craft whose range in the azimuthal direction to which the interrogation antenna array is instantaneously responsive, coincides with the phase displacement of the notch, so that positive means is thereby afforded for identifying the craft whose echo has been selected and dropped into said range-oscilloscope notch.

Figure 2:
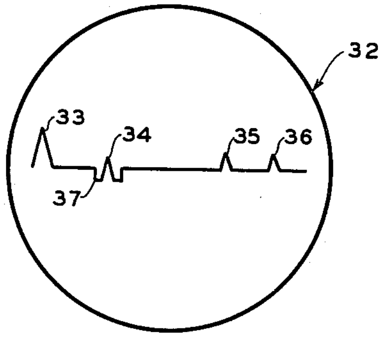
Figure 2 is a typical picture of the range-oscilloscope screen of the object detection system showing the presence of several targets.
Figure 3:
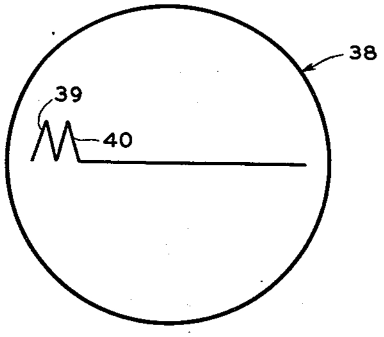
Figure 3 is a typical picture of a recognition signal oscilloscope, a component of the interrogation system of the present invention, in the presence of a friendly aircraft.
Figure 4:
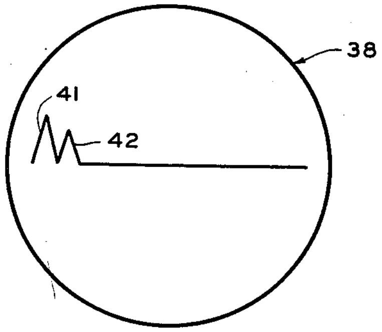
Figure 4 shows one typical appearance of the same oscilloscope in the presence of a hostile aircraft.

In Figure 2 of the drawings, we show the screen 32 of the range oscilloscope 20 of the detecting system with an instantaneous display of the main pulse transmission 33 and three echoes 34, 35, 36 indicating three objects at different distances in a single azimuthal plane with respect to the detecting station. The object causing the echo 34 has been selected for interrogation and therefore this echo appears within the notch 37. When, as shown in Figure 3 of the drawings, the screen 38 of the recognition oscilloscope 29 of the interrogation system displays, at the commencement of the sweep, two adjacent vertical deflections 39 and 40 of equal height, the equipment is trained upon the object causing the selected object 34 (Figure 2) and said object is therefore friendly. However, as shown in Figure 4 of the drawings, if the deflections 41 and 42 are of unequal magnitude then the object transmitting these signals is not in the "on target" plane to which the equipment is adjusted and the object causing the echo appearing within the notch of the oscilloscope 20 is hostile. It will also be apparent that should the oscilloscope screen 38 display no recognition signals while an echo appears in the notch on the screen 32 of the range-oscilloscope, such lack of signals being deemed a negative response, the object causing said echo must also be hostile.

Figure 5:
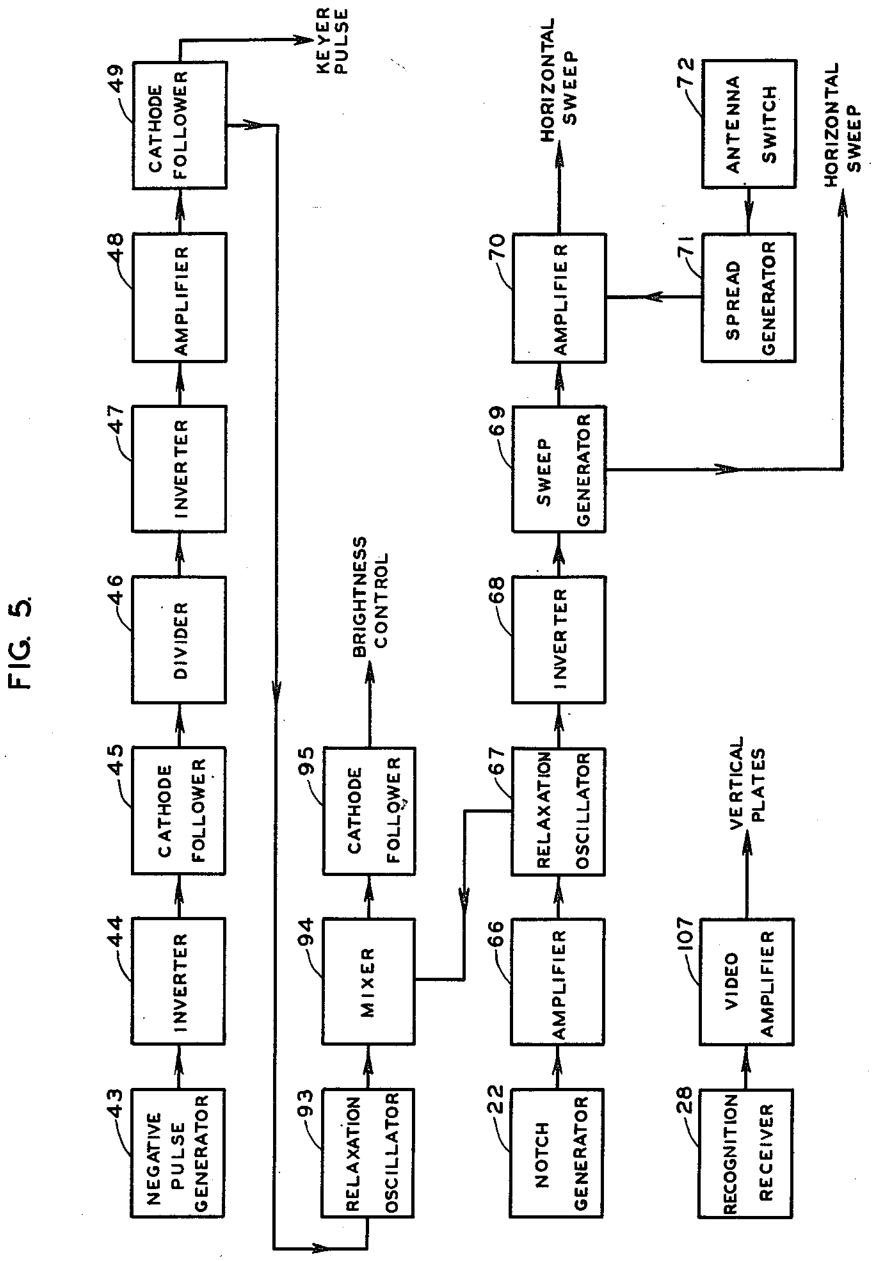
Figure 5 is a block diagram indicating the functions of the various components of the interrogation system of the present invention.

A fuller understanding of the synchronizing or keyer pulse generating section of the interrogation system of the present invention may be had by reference to the block diagram in Figure 5 of the drawings. As there shown, a negative pulse generator 43, synchronized with the pulse generator or keyer 16 of the detecting system (Figure 1), has its output fed to an inverter 44. The ouput of the inverter is applied to a cathode follower stage 45 and the output of this stage is fed to a frequency divider 46. As previously stated, the usual pulse frequency of a detection system is too high to employ for keying the interrogating or challenging signal of an interrogation system. Should several ground installations be directing their challenging signals at the same aircraft simultaneously, the high detection system frequency would jam the airborne unit or transponder and it is to eliminate this possibility that the pulse frequency of the interrogation system is made considerably lower than that of the detecting system.

The reduced frequency output is inverted as at 47, amplified as at 48, and then passed through a cathode follower stage 49 after which it is employed for keying the challenging signal transmitter 25 (Figure 1) of the interrogation system.

Of course, should the pulse rate of the detection system be fairly low to begin with, it may very well be unnecessary to reduce the same prior to keying the interrogation system transmitter.

One form of circuit which may be used for generating the interrogation keyer pulse is shown in Figure 6 of the drawings, this circuit consisting of the following:

Negative pulses from the generator 43 are fed to an unbiased vacuum tube 50 the plate output of which is applied to a vacuum tube 51 connected as a cathode follower stage. The cathode output of this stage is fed to the frequency divider 46 which consists of a pair of vacuum tubes 52 and 53. Plate voltage to these tubes is supplied respectively through resistors 54 and 55.

the latter being of lesser value than the former, resulting in the tube 53 being provided with a higher plate voltage. The cathodes of the tubes 52 and 53 are grounded through a common resistor 56 and the output of the tube 52 is coupled to the tube 53 through the series capacitor 57 and shunt resistors 58 and 59. It will be noted that the resistor 59 is variable, the purpose of this being to vary the time constant of the coupling circuit between the tubes 52 and 53 whereby frequency reduction may be obtained.

The plate output of the tube 53 is coupled to a vacuum tube 60 biased close to cut-off, the coupling including a pulsing network 61 comprising a capacitor 62 and resistor 63. The inverted output of the tube 60 is applied to an amplifying tube 64 and the output of the latter is applied to a vacuum tube 65 connected as a cathode follower stage. The cathode output of the latter is employed as the synchronizing voltage for the interrogation system transmitter 25 (Figure 1).

The mode of operation of the synchronizing or keyer pulse generating section of the interrogation system just described will be understood by reference to the wave shapes shown in Figures 10–A to 10–N inclusive.

As shown in Figure 10–A, the input to the vacuum tube 50 consists of negative pulses of the same frequency as the keying pulses of the detecting system. The plate output of this tube therefore consists of positive pulses, this being shown in Figure 10–B. Figure 10–C shows the input, also positive pulses, to the vacuum tube 51 and, inasmuch as this tube is connected as a cathode follower, the cathode output thereof also consists of positive pulses as shown in Figure 10–D. This output is applied to the grid of the vacuum tube 52, the input to this tube being shown in Figure 10–E.

For the description of the operation of the frequency divider 46 it will be assumed that the vacuum tube 52, is non-conducting, that the capacitor 57 is fully charged, and that the grid of the tube 53 is very positive so that said tube is drawing a heavy current and the voltage on the plate thereof is momentarily low. These conditions are shown at the extreme left in Figures 10–F, 10–G, and 10–H wherein there is respectively indicated a high plate voltage on the tube 52, a very high positive potential on the grid of the tube 53, and a very low voltage at the plate of said tube 53. Upon the application of the first positive pulse shown in Figure 10–E to the grid of the tube 52, the bias on said tube, developed by current flowing through the resistor 56 as a result of the conducting condition of the tube 53, is overcome and said tube starts to conduct. As a result, as shown in Figure 10–F, the plate voltage on said tube drops. Also as a result of the conducting condition of this tube, the capacitor 57 discharges to a certain valve therethrough by way of the resistors 58 and 59 and, as shown in Figure 10–G, the grid of the tube 53 is driven to a high negative potential, biasing said tube considerably beyond cutoff. As shown in Figure 10–H, the plate voltage on the tube 53 therefore rises.

Because of the non-conducting condition of the tube 53, the current flowing through the resistor 56 is now reduced and therefore, even after the first positive pulse input to the tube 52 has passed, the latter continues to conduct independently of the input thereto, so that the next few positive pulses on the grid thereof have no effect on the output of the tube 53 and frequency reduction is thereby attained. As soon as the first positive pulse on the tube 52 has passed, said tube becomes less conducting and the capacitor 57 commences to charge again. However, it requires a certain amount of time for the capacitor to become charged to an extent sufficient to render the tube 53 conducting again. Therefore, several pulses to the tube 52 will pass during which time the charge on the capacitor 57 will gradually rise, as will the potential on the grid of the tube 53. The time required for the tube 53 to become conducting again will be determined by the time constant of the R. C. combination consisting of the capacitor 57 and the resistors 58 and 59. The gradual rise of the potential on the grid of the tube 53 is indicated by the curved portion in the center of the voltage wave shown in Figure 10–G. When the tube 53 against becomes conducting current again flows through the resistor 56 biasing the tube 52 to cutoff. The result is an increase in the plate voltage of the tube 52 and a sudden surge of current through the capacitor 57 which, in turn, results in a sudden jump in the drop across the resistors 58 and 59 and therefore in the positive voltage on the grid of the tube 53. After the charge on the capacitor 57 reaches its maximum value, the rise of the voltage on the grid of the tube 53 tapers off, as does the rising voltage on the plate of the tube 52, as shown toward the right respectively in Figures 10–G and 10–F. At the instant when the tube 53 again becomes conducting and the voltage on the grid thereof suddenly pumps in a positive direction, the plate voltage on said tube 53 drops in a negative direction as shown at the right in Figure 10–H. It commences to rise slowly as the capacitor 57 passes its maximum charge and then, when the capacitor suddenly discharges, as previously described upon the application of a positive pulse to the grid of the tube 52, it again suddenly rises to its maximum positive value.

The substantially square-wave output of the tube 53, which is of reduced frequency, becomes distorted into negative and positive-going pulses through the functioning of the pulse-forming network 61 comprising the capacitor 62 and resistor 63, the drop in the plate voltage of the tube 53 resulting in a negative pulse and the rise in said voltage resulting in a positive pulse, as shown in Figure 10–I.

These negative and positive pulses are fed to the tube 60, which, being biased close to cutoff, can substantially amplify only the positive pulses, as shown in Figure 10–J. The input to the tube 64, shown in Figure 10–K, becomes inverted and amplified by said tube, the inverted, amplified voltage being shown in Figure 10–L. This voltage, as shown in Figure 10–M, is applied to the grid of the vacuum tube 65 connected as a cathode follower, the bias on this tube being such that the negative input thereto is clipped and the output in the cathode circuit thereof consists only of positive pulses, as may be seen in Figure 10–N. By comparing Figures 10–A and 10–N it will be seen that the pulse frequency has been reduced, the final output of reduced frequency being employed for keying the challenging signal generator 25 (Figure 1) of the interrogation system.

We shall now describe the sweep-generating section of the interrogation system oscilloscope of the present invention, for a functional understanding of which reference may be had to Figure 5 of the drawings. The output of the notch generator 22 of the detecting system which, it will be recalled, is synchronized with the pulse transmission of said system, is fed to an amplifier 66 and the amplified output of the latter is employed to trigger a relaxation oscillator 67 designed to produce a pulse output of variable width. The purpose of generating pulses of different widths is to enable the use of a single recognition signal oscilloscope when the system is adjusted for operation over different range limits. The width of the pulses which control the sweep generating circuit governs the speed of the sweep.

The pulse output of the relaxation oscillator 67 is fed to an inverter 68 and the output of the latter is applied to a saw-tooth generator 69. A portion of the saw-tooth wave is directly applied to one of the horizontal deflecting plates of the oscilloscope 29 (Figure 1) to obtain a horizontal sweep. Another portion of the sweep generator output is fed to an amplifier 70 where it is mixed with a square-wave voltage developed in a spread-voltage generator 71 controlled by a switching mechanism 72 synchronized with the antenna lobe-switching mechanism 30 (Figure 1). By means of this arrangement there is introduced into the amplifier 70 a square-wave voltage synchronized with the switching of the antenna response pattern, the mixed spread voltage and sweep voltage being applied to the remaining horizontal deflecting plate of the oscilloscope 29. This results in a push-pull sweep and the alternate displacement of the electron beam of the oscilloscope 29 to one side and then the other of its normal center position whereby the oscilloscope sweep is made to consist of two colinearly displaced and partially overlapping base lines. These base lines are alternately receptive of the output of the recognition receiver 28 (Figure 1), corresponding to the dual response pattern of the antenna array 26 and enabling the double image display to which reference has heretofore been made.

One form of circuit which may be employed for generating an oscilloscope sweep of the character just described is shown in Figure 7 of the drawings. As there shown, the negative-going output of the notch generator 22 is fed to an unbiased vacuum tube 73 and the amplified and inverted output of this tube is applied to the normally quiescent relaxation oscillator 67, which includes a pair of vacuum tubes 74 and 75. Plate voltage is supplied to these tubes respectively through resistors 76 and 77, the latter being of lesser value than the former so that the voltage applied to the plate of the tube 75 is higher than that applied to the tube 74. The output of the tube 74 is coupled to the input of the tube 75 through the series capacitor 78 and one or the other of a pair of shunt resistors 79 and 80, these resistors being of different values, and selection of one or the other being made through a switch 81. The cathodes of the tubes 74 and 75 are grounded through a common resistor 82. By this arrangement the width of the output of the relaxation oscillator 67 is made variable, as will hereinafter be more fully described.

The cathode output of the relaxation oscillator 67 is employed, as will later be set forth, for controlling a brightness-control circuit for the oscilloscope 29 (Figure 1); and the plate output of this oscillator is fed to a vacuum tube 83, functioning as an inverter. The output of this tube is directly applied, without any intermediate coupling, to the sweep generator 69. This generator includes a vacuum tube 84 the cathode of which is connected in series with the plate of a tube 85. Bias is applied to the tube 85 such that said tube draws a substantial current. Connected intermediate the plate and cathode of the tube 84 is a pair of saw-tooth generating capacitors 86 and 87 the selection of either of which may be made through a switch 88, these capacitors cooperating with the resistors 79 and 80 of the relaxation oscillator 67 to determine the speed of the sweep of the oscilloscope 29. The output across the selected capacitor 86 or 87, is applied to one of the horizontal deflecting plates of said oscilloscope.

A selected portion of this output is also applied to a vacuum tube 89 which, in cooperation with another vacuum tube 90 comprises the spread-voltage generator 71. Bias is applied to the grid of the tube 90 through a resistance network 91, the instantaneous value of said bias being controlled by the antenna switch 72 which operates, as previously indicated, in synchronism with the lobe-switching mechanism 30 of the antenna array 26 to periodically alter said bias to conform to a square wave.

The cathodes of the tubes 89 and 90 are grounded through a common resistor 92 and the plate output of the tube 89, which, as will later be explained, is a saw-tooth voltage superimposed upon a square-wave voltage, is applied to the remaining horizontal deflecting plate of the recognition oscilloscope 29 to complete the push-pull sweep and affect the colinear base line displacement to which reference has already been made.

The mode of operation of the circuit just described will best be understood by reference to Figures 11-A to 11-P inclusive and Figure 7. As may be seen from Figure 11-A, negative-going notches from the generator 22 are applied to the tube 73 which inverts and amplifies the same, as shown in Figure 11-B. A voltage of the same shape (Figure 11-C) is applied to the grid of the first tube 74 of the relaxation oscillator 67, a detailed description of the operation of the latter being as follows: It is to be assumed that, by reason of the low value of the resistor 77 as compared with that of the resistor 76, the tube 75 is conducting, the current thereof, flowing through the cathode resistor 82, biasing the tube 74 to cutoff. It is further to be assumed that the capacitor 78 is fully charged and the switch 81 is in engagement with the resistor 80, which is of lesser value than the resistor 79. As the grid of the tube 74 goes positive, as shown at the left of each pulse in Figure 11-C, the bias on said tube is overcome and the tube commences to conduct. The conducting state of this tube permits the capacitor 78 to discharge therethrough by way of the resistor 80 and the resulting voltage drop across this resistor drives the grid of the tube 75 highly negative, as may be seen at the left of each pulse in Figure 11-E. This renders the tube 75 non-conducting, reducing the flow of current through the resistor 82 and permitting the tube 74 to remain conducting, though less so, even after the pulse applied thereto has passed. Of course, as the tube 74 becomes conducting, its plate output goes negative, as shown at the left of each pulse in Figure 11-D, and, as shown at the left of each pulse in Figure 11-F, the plate output of the tube 75 simultaneously goes positive.

After each pulse applied to the tube 74 passes and the tube becomes less conducting, the capacitor 78 commences to recharge and the resulting initial voltage drop across the resistor 80 urges the grid of the tube 75 positive. At the same time the plate voltage on the tube 74 commences to go positive and the plate voltage on the tube 75 commences to go negative. This is shown respectively toward the right of each pulse in Figures 11–E, 11–D, and 11–F. As soon as the drop across the resistor 80 drives the grid of the tube 75 sufficiently positive to render said tube conducting again, current will again flow through the resistor 82 and the tube 74 will be biased to cutoff. This will cause a sudden increase in the plate voltage on said tube, as shown at the right of each pulse in Figure 11–D, and it will also cause a sudden surge of current to the capacitor 78 by way of the resistor 80, thus driving the grid of the tube 75 highly positive, as shown at the right of each pulse in Figure 11–E. A sudden drop in the plate potential of the tube 75 results, as shown at the right of each pulse in Figure 11–F. The circuit will remain substantially in this condition until the next positive pulse on the grid of the tube 74 causes said tube to become conducting again, when the cycle of operations described will be repeated.

If it is desired to increase the width of the output of the oscillator 67, the switch 81 is engaged with the higher value resistor 79, thereby increasing the time constant of the R. C. coupling between the tubes 74 and 75 and maintaining the tube 75 at cutoff for a longer period. The dotted lines in Figures 11–E to 11–I inclusive show the pulse widths resulting from the use of the higher value resistor 79.

The pulse input to the tube 83 which, as shown in Figure 11–G, is the same as the output of the tube 75, results in negative pulses in the plate circuit of the tube 83, as shown in Figure 11–H, and the same shape wave, shown in Figure 11–I, is applied to the grid of the tube 84.

As previously indicated, the tube 84, in cooperation with the tube 85 and the capacitors 86 or 87, form the sweep generator 69 and the operation of this circuit is as follows:

The tube 85 is biased to draw a heavy current and, inasmuch as between pulses to the tube 84 the latter is conducting, no current can flow to the capacitors 86 or 87. If the switch 81 of the oscillator 67 is engaged with the resistor 80, corresponding to the fast sweep, the switch 88 is engaged with the capacitor 87, assumed to be of lesser value than the capacitor 86. As the grid of the tube 84 goes negative upon the application of the pulse input thereto, said tube is rendered non-conducting and the capacitor 87 becomes charged through the tube 85, as shown in Figure 11–J. The rate of this charge will obviously depend upon the value of the capacitor. The dotted lines in Figures 11–J to 11–L inclusive show pulse widths resulting from the use of the higher value capacitor 86.

The negative potential across the capacitor is applied to one of the horizontal plates of the oscilloscope 29 (Figure 1) and a portion of said potential is also applied, as shown in Figure 11–K, to the grid of the tube 89.

The switch 72, operated in synchronism with the lobe-switching mechanism 30 of the antenna array 26, causes the generation of the square-wave voltage shown in Figure 11–M, this voltage being applied to the grid of the tube 90, and resulting in the cathode output of said tube shown in Figure 11–N. The tube 90 is conducting at all times, although the cathode output thereof varies in accordance with the square-wave input thereto.

Without the application of the square-wave cathode output of the tube 90 to the tube 89 the plate output of the latter is as shown in Figure 11–L and this output, of opposite polarity to the potential across the sweep capacitor 86 or 87, is applied to the remaining horizontal deflecting plate of the oscilloscope 29 to complete the push-pull sweep thereof. However, as the current drawn by the tube 90 is increased upon the application of the positive portion of the square-wave input thereto, the current flowing through the resistor 92 is increased and the bias on the tube 89 is therefore also increased. The normal current of the tube 89 therefore decreases and, inasmuch as the negative saw-tooth wave shown in Figure 11–K is also applied to the grid of said tube 89, the combined input to said tube has the appearance of the wave shown in Figure 11–O. As a result, the complete output in the plate circuit of the tube 89 will have the configuration of the wave shown in Figure 11–P and it is this combined wave which is applied to the remaining horizontal plate of the oscilloscope 29 to cause the previously referred to colinear displacement of the base line in synchronism with the switching of the response pattern of the antenna array 26 (Figure 1).

We shall now describe the brightness-control circuit to which reference was made during the description of the output of the relaxation oscillator 67 of the recognition oscilloscope sweep generating circuit.

It will be recalled that the pulse frequency of the interrogation system is preferably considerably lower than that of the detecting system and it will also be recalled that the sweep for the recognition signal oscilloscope is generated in synchronism with the pulse frequency of the detecting system. Inasmuch as it is desirable, in the interest of clearer reading, to maintain the sweep trace of the recognition signal oscilloscope below the visibility level except for the short period corresponding to the time necessary for a challenging signal to travel out to the maximum range of the system and any recognition signal triggered thereby to return to the site of the station, it becomes necessary to blank out the trace of the recognition signal oscilloscope for the time intermediate said periods. This may be accomplished by mixing a portion of the interrogation keyer-pulse output, derived from the cathode follower stage 49 (Figure 5), with a portion of the output of the relaxation oscillator 67, one of the components of the sweep generator just described, and this may be accomplished as follows:

A portion of the output of the cathode follower 49 is fed, as shown in Figure 5 of the drawings, to a relaxation oscillator 93 which transforms the short sharp keying pulses into negative-going pulses of considerably greater width separated by comparatively long positive portions. The output of the relaxation oscillator 93 is fed to a mixer stage 94 where it is combined with a portion of the output of the relaxation oscillator 67 of the recognition oscilloscope sweep generating circuit. The combined recognition keyer pulse and sweep generating pulse is fed to a cathode follower stage 95 and the cathode output of this stage is applied to the intensity grid of the recognition signal oscilloscope 29 to control the brightness thereof, maintaining the sweep trace below the level of visibility except during the period of the sweep synchronized with the pulse transmission of the interrogation transmitter 25 (Figure 1).

One form of circuit which may be used for this purpose is shown in Figure 8 of the drawings and is as follows: A portion of the output of the interrogation keyer pulse generator, consisting of positive pulses of a lower frequency than that of the detection system pulse rate, is applied to the grid of a vacuum tube 96 which, together with a vacuum tube 97 constitutes the relaxation oscillator 93 which is normally quiescent. Plate voltage to the tubes 96 and 97 is supplied respectively through resistors 98 and 99, the latter being of lesser value than the former, resulting in a higher plate voltage on the tube 97 than on the tube 96. The cathodes of these tubes are grounded through a common resistor 100 and the output of the tube 96 is coupled to the input of the tube 97 by means of a series capacitor 101 and shunt resistor 102. The time constant of this RC coupling is such as to transform the short, sharp pulses of the keyer pulse generator into pulses of appreciable width, the width being equal to the time representing the maximum range of the detecting system. The cathode output of the relaxation oscillator 93 is applied to the grid of a tube 103, constituting the first portion of the above referred to mixer stage, the second portion of this mixer stage including the tube 104 receptive of a portion of the output of the relaxation oscillator 67 of the sweep generator. The plates of the tubes 103 and 104 are directly connected with each other, as are the cathodes of these tubes. The combined plate output of these tubes is applied to the grid of a tube 105 connected as a cathode follower stage and having its cathode output connected with the intensity grid of the recognition signal oscilloscope 29 (Figure 1).

The operation of this circuit may best be understood by reference to the wave shapes set forth in Figures 12-A to 12-J inclusive. As shown in Figure 12-A, positive pulses, synchronized with the transmission of the challenging signals of the interrogation transmitter 25 (Figure 1), are applied to the first tube 96 of the relaxation oscillator 93. Assuming that the tube 97 is conducting and, that by reason of the current flowing through the resistor 100, the tube 96 is non-conducting, and that the capacitor 101 is fully charged, the application of each positive pulse to the grid of the tube 96 renders such tube conducting. This permits the capacitor 101 to discharge through said tube by way of the resistor 102. The large surge of the discharge current through the resistor 102 drives the grid of the tube 97 highly negative, as shown at the left of the pulses in Figure 12-C of the drawing. This reduces the current flowing through said tube and also through the resistor 100, resulting in maintaining the tube 96 in a conducting state even after the first pulse applied thereto has passed. The conducting state of the tube 96 decreases the plate voltage thereof, as shown at the left of the pulses in Figure 12-B, and the non-conducting state of the tube 97 decreases the cathode output of said tube, as shown at the left of the pulses in Figure 12-D. After the initial surge of discharge current through the resistor 102, the drop across said resistor decreases and as a result, the grid of the tube 97 commences to go positive again, as shown at the center of the pulses in the Figure 12-C. This results in a gradual increase of the conductivity of the tube 97, and a gradual increase of the bias on the tube 96 through the resistor 100. An increase in the plate voltage on the tube 96, and an increase in the cathode output of the tube 97 is caused thereby, as shown in Figures 12-B and 12-D. When the potential on the grid of the tube 97 has reached a sufficient value to result in a bias through the resistor 100 great enough to render the tube 96 non-conducting, there will be a surge of current, passing through the resistor 102, to render the grid of the tube 97 highly positive, as shown at the right of each pulse in Figure 12-C. The plate voltage of the tube 96 will correspondingly rise, as shown in Figure 12-B, as will the cathode output of the tube 97, as shown in Figure 12-D. Between the pulses applied to the grid of the tube 96, and following the initial surges of charging current to the capacitor 101, there will be a gradual decrease in the positiveness of the grid of the tube 97, as shown at the long center portion of Figure 12-C.

The input to the tube 103, shown in Figure 12-E, is inverted by said tube, as shown in Figure 12-F, and the output of this tube is mixed, as will now be described, with a portion of the output of the relaxation oscillator 67 of the recognition-signal oscilloscope sweep generating circuit. Such output, shown in Figure 12-G, consists of negative pulses separated by relatively long positive periods, the negative pulses being synchronized with the pulse transmission of the detecting system. These pulses are applied to the grid of the tube 104 and are inverted thereby, as shown in Figure 12-H. The plate output of the tube 103 and that of the tube 104 are mixed, resulting in an input to the tube 105, consisting of strong positive pulses separated by groups of relatively weak positive pulses, as shown in Figure 12-I. The tube 105, connected as a cathode follower, is so biased as to pass only the strong positive pulses of the input thereto, as shown in Figure 12-J, and the resulting output is applied to the intensity grid of the recognition oscilloscope to render the trace on the screen of said scope visible only for the duration of each sweep corresponding to the pulse transmission of the interrogation transmitter 25, said intensity grid being maintained at such a negative level during the periods intermediate these particular sweeps, as to maintain the trace invisible.

Figure 9:
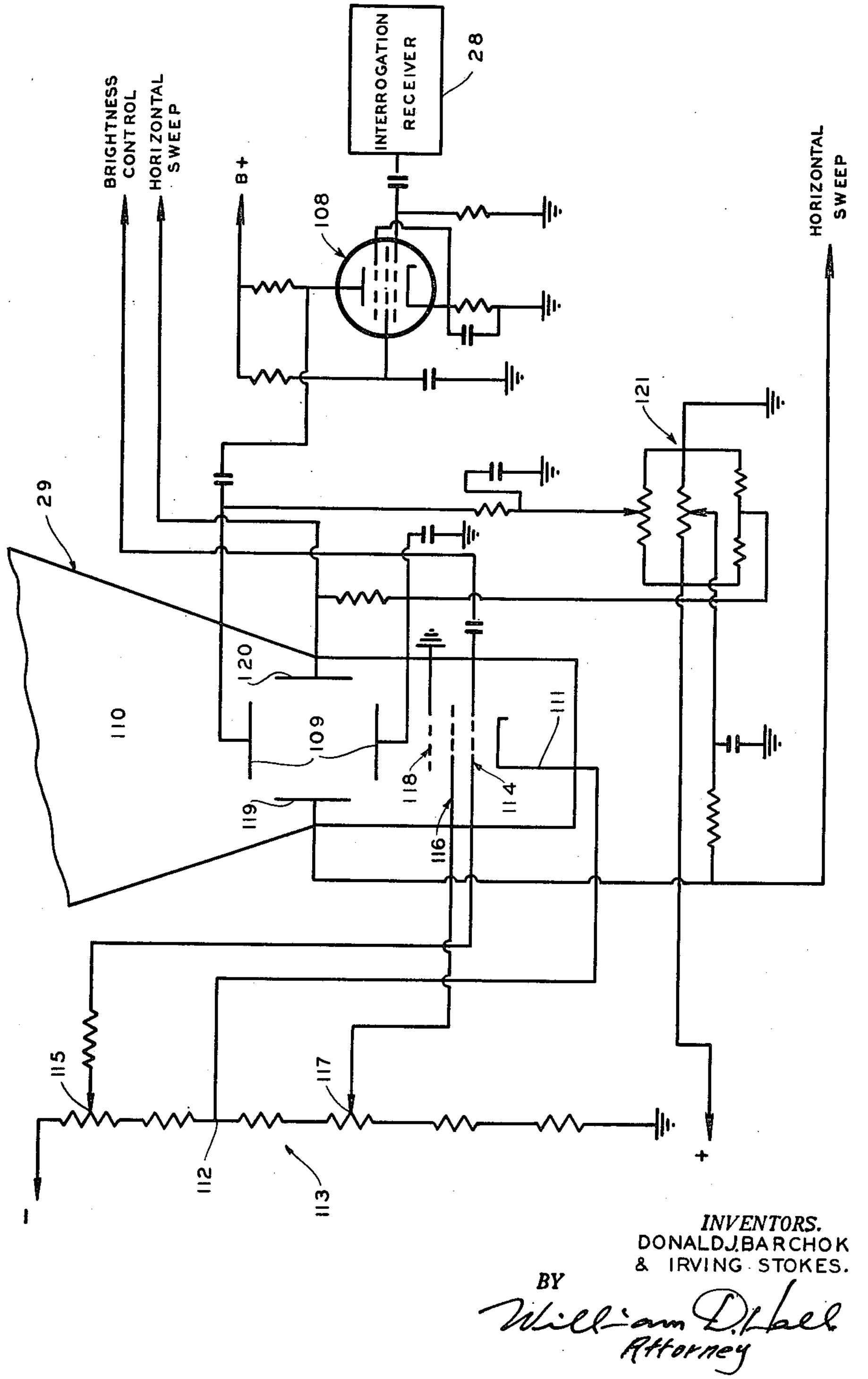
Figure 9 is a schematic diagram of a video amplifier and an oscilloscope and the manner in which said oscilloscope is connected with the circuits of Figures 6, 7, and 8.

We shall now describe the final section of the interrogation system of the present invention, and the manner of connecting the same, together with the previously described sections, with the recognition signal oscilloscope 29. As may be seen from Figures 5 and 9 of the drawings, the output of the recognition receiver 28, which consists of the signals picked up by the antenna array 26 (Figure 1), is fed to a video amplifier 107 which includes the vacuum tube 108. The amplified output of the tube 108 is applied to the vertical deflecting plates 109 of the cathode ray tube 110 of the recognition oscilloscope 29.

The tube 110 has its cathode 111 connected to a point 112 on a bleeder resistor 113 disposed across a source of high voltage having its positive end grounded. The intensity grid 114 of the tube 110 is connected, through an adjustable arm 115 to the bleeder 113 at such a point as to make the grid 114 negative with respect to the cathode 111. The first anode 116 of the tube 110 is also connected through an adjustable arm 117 to the bleeder 113, this point of contact being considerably positive with respect to the connection 112; and the second anode 118 of the tube 110 is grounded, thereby placing the same at a very high potential with respect to the cathode 111.

The initial position of the electron beam of the tube 110 may be controlled through the application of positive potentials to the vertical deflecting plates 109 and the horizontal deflecting plates 119 and 120 through a variable resistance network 121, said network being connected between ground and a point of suitably higher positive potential.

As indicated in earlier portions of this specification, the horizontal deflecting plate 119 is receptive of the combined outputs of the vacuum tubes 89 and 90 of the sweep-generating circuit shown in Figure 7 of the drawings, and the horizontal deflecting plate 120 is receptive of the cathode output of the vacuum tube 84 of said sweep-generating circuit, while the grid 114 of the cathode ray tube is receptive of the output of the vacuum tube 105 of the brightness-control circuit shown in Figure 8 of the drawings.

This completes the description of the aforesaid illustrative embodiment of the interrogation system of the present invention, including the manner in which said system may be combined with an object detection system for the purpose of identifying detected aircraft from the ground to determine whether said aircraft are friendly or hostile, and the operation of the entire system may be briefly summarized as follows:

Pulses of high frequency energy are directionally radiated into space at an audio frequency rate by means of the detecting system transmitter. Any echoes from objects in space, such as aircraft, are picked up by the antenna of said system and, after detection, are displayed upon the range oscilloscope thereof. Said echoes are also displayed upon the PPI oscilloscope employed, as set forth in earlier portions of this specification, to determine the azimuthal bearings of the detected craft, thereby enable the operator to halt the scanning operation and point the antennae for transmission in the direction of the craft to be challenged. Should there be a number of craft in a particular azimuthal direction to which the antenna system is adjusted, each will appear as a vertical deflection of the oscilloscope base line, as shown in Figure 2 of the drawings. By adjusting the phase of the notch in the oscilloscope base line with respect to the voltage for generating the oscilloscope sweep, a selected one of said echoes can be centered within said notch to obtain a reading of the range of the object causing the selected echo. Thus, in Figure 2 of the drawings, the echo 34 is within the notch and the object causing this echo is the one to be challenged by the interrogation system.

A voltage, generated in synchronism with the keying voltage of the detecting system, is subjected to frequency reduction and then utilized to key the interrogation transmitter so as to radiate into space pulses of high frequency energy at an audio frequency rate, the antenna array of the interrogation system being mechanically coupled with the antenna array of the detecting system so that the transmissions of both sytems are directed in the same azimuthal plane to which the operator has adjusted the system. The antenna array of the interrogation system is provided with a lobe-switching mechanism so as to provide said array with a dual response pattern, and the recognition signals transmitted to the ground station from a friendly aircraft whose transmitter has been triggered by the aforementioned challenging signals are detected by the recognition receiver and applied, through a video amplifier to the vertical deflecting plates of the recognition signal oscilloscope.

The sweep for the recognition signal oscilloscope is generated by employing a portion of the voltage utilized in the detecting system for providing the base line of the range oscilloscope with the echo-selecting notch heretofore referred to so that the display at the commencement of the recognition oscilloscope sweep can only result from a response from the craft whose echo appears within the notch of the range oscilloscope. The sweep, which is of the push-pull saw-tooth type, has superimposed thereon a square-wave voltage so as to colinearly displace the base line in synchronism with the switching of the response pattern of the interrogation antenna array.

A portion of the pulse output of the keyer section of the interrogation system is mixed with a portion of the output of the sweep generator so as to blank out the trace of the recognition oscilloscope except during the periods corresponding to the pulse transmission of the interrogation system.

By means of these arrangements, the response signals appearing upon the screen of the recognition signal oscilloscope take the form of adjacent vertical deflections of the base line of said oscilloscope and when these deflections are of equal magnitude, as indicated in Figure 3 of the drawings, it informs the observer that the object emitting said signals is in the azimuthal plane to which the equipment has been adjusted, and that the object, appearing within the notch of the range oscilloscope, which has been selected for challenge, is friendly.

Any other display upon the screen of the recognition signal oscilloscope at a time when an echo appears within the notch of the range oscilloscope informs the observer that the craft causing said echo is hostile. For example, should the deflections in the base line of the recognition signal oscilloscope be of unequal magnitude, as shown in Figure 4 of the drawings, the operator is informed that, while there may be a friendly aircraft in the vicinity, it is not the one that is in the azimuthal plane to which the equipment is adjusted and the object causing the echo which appears within the notch of the range oscilloscope, which is in such azimuthal plane, is hostile. Or, if the recognition signal oscilloscope displays no signals while an echo appears within the notch of the range oscilloscope, said lack of signals being considered a negative response, this too indicates that the echo-causing aircraft is hostile.

Thus we have provided an interrogation system for positively identifying, from the ground, selected objects in space, such as aircraft, said system being accurate and fool-proof.

By means of the present invention we have also provided an interrogation system which, while operating in close cooperation with an object detection system, is sufficiently isolated therefrom to eliminate unfavorable interaction between the two and requires no substantial alteration of the detecting equipment.

While we have described in detail herein a specific form of the interrogation system of the present invention it is to be clearly understood that said form is merely illustrative and is not intended to limit the true spirit and scope of the invention as expressed in the claims hereto appended.

We claim:

1. The method of controlling the brightness of an oscilloscope trace which includes the steps of generating a voltage of predetermined frequency, utilizing a portion of the voltage so generated for the generation of a sweep voltage for said oscilloscope, altering the frequency of another portion of said first-named voltage so that it bears a predetermined frequency ratio to said second-named voltage, altering the phase of said second-named voltage so that it bears a predetermined time relationship to said first-named voltage, combining a portion of said voltage of altered frequency with a portion of said voltage of altered phase, and applying the resulting combined voltage to the intensity grid of said oscilloscope.

2. In combination with a craft detecting system including a transmitter and keyer for generating high frequency energy and directionally radiating the same to scan a predetermined region of space, a receiver responsive to reflections of said energy from any craft within said region, and means receptive of the output of said receiver for determining the location in azimuth and the range of a selected one of said craft; a system for interrogating the selected craft comprising, means for generating a challenging signal and radiating the same into space in directional alignment with the radiation of the high frequency energy of said detecting system, means for detecting recognition signals from a transmitter carried by certain craft and triggered by said challenging signal, means receptive of the output of said detecting means for displaying said recognition signals, and means for synchronizing the operation of said display means with the range determining means of said detecting system whereby the recognition signals from the craft selected for interrogation appearing upon said display means can readily be identified.

3. In combination with a craft detecting system including a transmitter and keyer for generating high frequency energy and directionally radiating the same to scan a predetermined region of space, a receiver responsive to reflections of said energy from any craft within said region, and means receptive of the output of said receiver for determining the location in direction and the range of a selected one of said craft; a system for interrogating the selected craft comprising, means including a high frequency oscillator, a keyer, and an antenna array for generating a challenging signal and radiating the same into space in directional aligment with the radiation of the high frequency energy of said detecting system, said keyer being locked in with the keyer of said detecting system at a submultiple frequency, means for detecting recognition signals from a transmitter carried by certain craft and triggered by said challenging signal, means receptive of the output of said detecting means for displaying said recognition signals, and means for synchronizing the operation of said display means with the range determining means of said detecting system whereby the recognition signals from the craft selected for interrogation appearing upon said display means can readily be identified.

4. In combination with a craft detecting system including a transmitter and keyer for generating high frequency energy and directionally radiating the same to scan a prdetermined region of space, a receiver responsive to reflections of said energy from any craft within said region, means receptive of the output of said receiver for determining the location in direction and the range of a selected one of said craft; a system for interrogating the selected craft comprising, means for generating a challenging signal and radiating the same into space in directional alignment with the radiation of the high frequency energy of said detecting system, means for detecting recognition signals from a transmitter carried by certain craft and triggered by said challenging signal, said detecting means including an antenna array having a dual response pattern and a receiver connected thereto, means receptive of the output of said detecting means for displaying said recognition signals, and means for synchronizing the operation of said display means with the range determining means of said detecting system whereby the recognition signals from the craft selected for interrogation appearing upon said display means can readily be identified.

5. In combination with a craft detecting system including a transmitter and keyer for generating high frequency energy and directionally radiating the same to scan a predetermined region of space, a receiver responsive to reflections of said energy from any craft within said region, means receptive of the output of said receiver for determining the location in direction and the range of a selected one of said craft, a system for interrogating the selected craft comprising, means including a high frequency oscillator, a keyer, and an antenna array for generating a challenging signal and radiating the same into space in directional alignment with the radiation of the high frequency energy of said detecting system, said keyer being locked in with the keyer of said detecting system at a sub-multiple frequency, means for detecting recognition signals from a transmitter carrier by certain craft and triggered by said challenging signal, said detecting means including an antenna array having a dual response pattern and a receiver connected thereto, means receptive of the output of said detecting means for displaying said recognition signals, and means for synchronizing the operation of said display means with the range determining means of said detecting system whereby the recognition signals from the craft selected for interrogation appearing upon said display means can readily be identified.

6. In combination with a craft detecting system including a transmitter and keyer for generating high frequency energy and directionally radiating the same to scan a predetermined region of space, a receiver responive to reflections of said energy from any craft within said region, means receptive of the output of said receiver for determining the location in direction and the range of a selected one of said craft; a system for interrogating the selected craft comprising, means for generating a challenging signal and radiating the same into space in directional alignment with the radiation of the high frequency energy of said detecting system, means for detecting recognition signals from a transmitter carried by certain craft and triggered by said challenging signal, said detecting means including an antenna array having a dual response pattern and a receiver connected thereto, an oscilloscope receptive of the output of said detecting means and having a sweep circuit for generating two colinearly displaced base lines for displaying a double image of said recognition signals, and means for synchronizing the operation of said oscilloscope with the range determining means of said detecting system whereby the recognition signals from the craft selected for interrogation appearing upon said oscilloscope can readily be identified.

7. In combination with a craft detecting system including a transmitter and keyer for generating high frequency energy and directionally radiating the same to scan a predetermined region of space, a receiver responsive to reflections of said energy from any craft within said region, means receptive of the output of said receiver for determining the location in direction and the range of a selected one of said craft; a system for interrogating the selected craft comprising, means for generating a challenging signal and radiating the same into space in directional alignment with the radiation of the high frequency energy of said detecting system, means for detecting recognition signals from a transmitter carried by certain craft and triggered by said challenging signal, said detecting means including an antenna array having a dual response pattern and a receiver connected thereto, an oscilloscope receptive of the output of said detecting means and having a sweep circuit for generating two colinearly displaced base lines for displaying a double image of said recognition signals, and means for synchronizing the operation of said oscilloscope with the range determining means of said detecting system whereby the recognition signals from the craft selected for interrogation appearing upon said oscilloscope can readily be identified, said synchronizing means including a circuit for triggering said oscilloscope sweep circuit in phase with the operation of the range determining means of said detecting system.

8. In combination with a craft detecting system including a transmitter and keyer for generating high frequency energy and directionally radiating the same to scan a predetermined region of space, a receiver responsive to reflections of said energy from any craft within said region, means receptive of the output of said receiver for determining the location in direction and the range of a selected one of said craft; a system for interrogating the selected craft comprising, means for generating a challenging signal and radiating the same into space in directional alignment with the radiation of the high frequency energy of said detecting system, means for detecting recognition signals from a transmitter carried by certain craft and triggered by said challenging signal, said detecting means including an antenna array having a dual response pattern and a receiver connected thereto, an oscilloscope receptive of the output of said detecting means and having a sweep circuit for generating two colinearly displaced base lines for displaying a double image of said recognition signals, means for intensifying the trace of said base lines in synchronism with the display of said recognition signals, and means for synchronizing the operation of said oscilloscope with the range determining means of said detecting system whereby the recognition signals from the craft selected for interrogation appearing upon said oscilloscope can readily be identified.

9. In combination with a craft detecting system including a transmitter and keyer for generating high frequency energy and directionally radiating the same to scan a predetermined region of space, a receiver responsive to reflections of said energy from any craft within said region, means receptive of the output of said receiver for determining the location in direction and the range of a selected one of said craft; a system for interrogating the selected craft comprising, means for generating a challenging signal and radiating the same into space in directional alignment with the radiation of the high frequency energy of said detecting system, means for detecting recognition signals from a transmitter carried by certain craft and triggered by said challenging signal, said detecting means including an antenna array having a dual response pattern and a receiver connected thereto, an oscilloscope receptive of the output of said detecting means and having a sweep circuit for generating two colinearly displaced base lines for displaying a double image of said recognition signals, means for intensifying the trace of said base lines in synchronism with the display of said recognition signals, and means for synchronizing the operation of said oscilloscope with the range determining means of said detecting system whereby the recognition signals from the craft selected for interrogation appearing upon said oscilloscope can readily be identified, said synchronizing means including a circuit for triggering said oscilloscope sweep circuit in phase with the operation of the range determining means of said detecting system.

10. In combination with a craft detecting system including a transmitter and keyer for generating high frequency energy and directionally radiating the same to scan a predetermined region of space, a receiver responsive to reflections of said energy from any craft within said region, means receptive of the output of said receiver for determining the location in direction and the range of a selected one of said craft; a system for interrogating the selected craft comprising, means cluding a high frequency oscillator, a keyer, and an antenna array for generating a challenging signal and radiating the same into space in directional alignment with the radiation of the high frequency energy of said detecting system, said keyer being locked in with the keyer of said detecting system at a sub-multiple frequency, means for detecting recognition signals from a transmitter carried by certain craft and triggered by said challenging signal, said detecting means including an antenna array having a dual response pattern and a receiver connected thereto, an oscilloscope receptive of the output of said detecting means and having a sweep circuit for generating two colinearly displaced base lines for displaying a double image of said recognition signals, means including a circuit for mixing a portion of said interrogation system keyer output with a portion of said sweep circuit output and applying the same to the intensity grid of said oscilloscope for intensifying the trace of said base lines in synchronism with the display of said recognition signals, and means for synchronizing the operation of said oscilloscope with the range determining means of said detecting system whereby the recognition signals from the craft selected for interrogation appearing upon said oscilloscope can readily be identified, said synchronizing means including a circuit for triggering said oscilloscope sweep circuit in phase with the operation of the range determining means of said detecting system.

11. In combination with an oscilloscope, a circuit for controlling the brightness of the trace of said oscilloscope comprising a relaxation oscillator for generating pulses of predetermined width at a predetermined frequency, a second relaxation oscillator for generating pluses of substantially similar width but at a multiple frequency of said first mentioned oscillator, a vacuum tube circuit for combining the outputs of said relaxation oscillators, and another vacuum tube circuit receptive of the combined output of said first named vacuum tube circuit permitting the passage therethrough of only such portion of said combined output as exceeds a predetermined magnitude and means coupling the output of said last-named circuit to the intensity grid of said oscilloscope.

DONALD J. BARCHOK.
IRVING STOKES.

REFERENCES CITED

The following references are of record in the file of this patent:

UNITED STATES PATENTS

| Number | Name | Date |
|---|---|---|
| 2,114,938 | Puckle | Apr. 19, 1938 |
| 2,132,655 | Smith | Oct. 11, 1938 |
| 2,157,434 | Potter | May 9, 1939 |
| 2,185,363 | White | Jan. 2, 1940 |
| 2,193,868 | Geiger | Mar. 19, 1940 |
| 2,195,972 | Pieplow | Apr. 2, 1940 |
| 2,281,948 | Pieplow | May 5, 1942 |
| 2,407,199 | Wolff | Sept. 3, 1946 |